United States Patent Office.

JAMES R. WOODWORTH, OF NUNDA, NEW YORK.

Letters Patent No. 61,787, dated February 5, 1867.

IMPROVED ROOFING.

*The Schedule referred to in these Letters Patent and making part of the same.*

TO ALL WHOM IT MAY CONCERN:

Be it known that I, JAMES R. WOODWORTH, of the town of Nunda, in the county of Livingston, in the State of New York, have invented a new and improved Composition for Roofing Buildings; and I do hereby declare that the following is a full and exact description thereof.

To enable others to make and use my invention, I will proceed to describe its construction and composition.

I first cover the rafters with boards as I would for shingling; I then cover the boards with laths as I would for a side wall or ceiling; I then cover the laths with water-lime plaster (hydraulic cement) about one-half inch thick or common brick or plastering mortar, or both mortars mixed. When dry or nearly so, I spread coal tar (gas tar,) about one-eighth of an inch thick, either raw or boiled, hot or cold, as the weather or occasion requires. I then throw on dry sand enough to absorb the tar, which when dry forms a hard cement, and one or more coats finish the roof.

I do not claim any of the ingredients separately. But what I claim as my invention, and desire to secure by Letters Patent, is—

The combination of the ingredients, substantially as and for the purpose set forth.

JAMES R. WOODWORTH.

Witnesses:
JONATHAN MILLER,
URIEL B. MOYER.